March 10, 1970    KEISUKE TAKADA ET AL    3,500,165
COMPUTER CONTROL DEVICE
Filed June 21, 1967
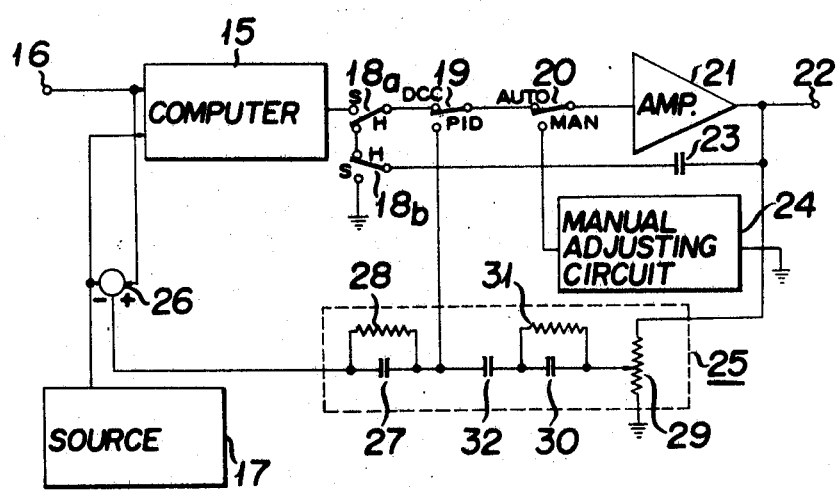
KEISUKE TAKADA,
RYUICHI KUWATA,
BY
INVENTORS

United States Patent Office 3,500,165
Patented Mar. 10, 1970

3,500,165
COMPUTER CONTROL DEVICE
Keisuke Takada and Ryuichi Kuwata, Tokyo, Japan, assignors to Tokyo Shibaura Electric Co., Ltd., Kawasaki-shi, Japan, a corporation of Japan
Filed June 21, 1967, Ser. No. 647,856
Claims priority, application Japan, June 24, 1966, 41/40,646
Int. Cl. H02j 9/04
U.S. Cl. 320—1     7 Claims

ABSTRACT OF THE DISCLOSURE

A direct digital control system wherein a single digital computer is employed instead of a number of conventional analog controllers to sample and compute the manipulated variables in a plurality of control loops by time sharing and to drive or automatically control an actuator by its output. The resultant output computed by the computer is memorized by a hold amplifier consisting of an operational amplifier and a hold condenser, and such memorized value is stored until the next sampling period in the computer and the output signal from the computer continues to be supplied to the actuator through the hold amplifier, until the next sampling period. When the digital computer malfunctions, the function of the system is backed up by an analog R-C network which is provided separately of the operational amplifier and which forms a PID controller.

---

This invention relates to a direct digital control system (for brevity, hereinafter will be abbreviated as "DDC system") and more particularly to a computer control device including a circuit for providing backup protection upon occurrence of faults in the computer.

The DDC system which has become interested in the art is a control system wherein the control operation of a feedback control system heretofore performed by analog controller is effected by a digital control computer. This system is a new computing system in which a considerable number of control loops are treated on the time sharing system.

Generally, in a well known DDC system a single digital computer is utilized for a plurality of control systems. After comparing a measured value of the controlled variable transmitted from a detector of each of said control systems with a reference value or a set point by means of a comparator, the compared value is read by sampling it at a suitable interval of time whereby to derive from the control system a controlling value of the magnitude necessary to bring to zero the error or the deviation between the measured value and the reference value to drive apparatus on the actuator.

When compared with a conventional analog control system including a plurality of independent control loops, the operation time of the digital computer including such a DDC system is extremely shorter than the sampling time so that it is able to calculate controlling values of a number of control systems during one sampling period. Further the cost of installation is not expensive. However, this DDC system has following defects or problems.

More particularly, when the digital computer becomes out of order or loses its control ability, since a single computer is associated with a number of control loops, operations of all control systems will be stopped thus causing great trouble in the plant operation. As one solution for these problems, it has been proposed to installation of a conventional analog controller in parallel with the digital computer. However, this approach is expensive and requires a large amount of floor space for installation.

Another problem is the transmission of signals from the computer to the actuator or terminal connected to various operating apparatus. More specifically, the actuator is generally supplied with analog signals, and especially the actuator is required to hold the position corresponding to the actuating signal during the time from one sampling time of the computer to the next sampling time. Heretofore, such holding of outputs of the actuator was effected by means of a pulse motor which was driven by the output from the digital computer to convert its angle of rotation into an analog signal by means of a mechanical element such as a potentiometer or the like and to drive the actuator by said analog signal. However, as such a holding means for the analog signal includes a mechanical element its life is short, reliability is low and in addition expensive.

This invention contemplates to eliminate the above described defects and to provide a highly reliable and economical control device for a computer by providing means to feedback the control function of a digital computer when it becomes out of order to lose its control function and by connecting a memory device between the actuator and an input terminal of an operatiional amplifier to hold outputs at the actuator.

The invention will be more fully understood from the following detailed description taken in connection with the accompanying drawing.

A single figure of the accompanying drawing is a block connection diagram of one embodiment of this invention.

Referring now to the accompanying drawing which illustrates one embodiment of this invention there is shown a control computer 15 including an operation circuit, an analog to digital conversion circuit, a scanning circuit and the like (not shown in the drawing). Measured signals sent from a detector (not shown) and proportional to the controlled variable are supplied to an analog input terminal 16 of the computer. Although, in the accompanying drawing there is shown only one control system, it is to be understood that actually all measured signals from a plurality of control systems are supplied to the computer to be scanned according to the sampling period. Since the construction of the back-up device of this invention is the same for all control systems only one of them will be described in detail. The reference value is provided by a source 17 whereby the measured input signal supplied to the input terminal 16 at a predetermined sampling period and its reference value are written in the computer 15 which functions to compare them to convert the difference therebetween into a digital quantity. The computer also performs an operation in accordance with a predetermined control equation to convert the result of operation into an analog quantity which is sent out as an actuating variable. The output from the computer is supplied to an operation amplifier 21 through a switch 18a operated under the command of the computer, a transfer switch 19 which provides transfer between DDC and PID and an automatic or manual transfer switch 20, the output terminal 22 of the amplifier being connected to an operating terminal, not shown.

The operational amplifier 21 comprises a holding circuit for the computer output together with an output holding condenser 23 connected between the input and output of the amplifier via the switch 18b. During the sampling time in which the output from the computer is supplied to the amplifier, switches 18a and 18b are thrown to the side S whereas during the time other than the sampling time to the side H. The transfer switch 19 is thrown to the DDC side during computer control and to the PID side when the computer becomes out of order and the conventional analog control is to be connected for back-up purpose. The transfer switch 20 is thrown to the AUTO side during automatic control whereas and to the MAN side during manual control to receive signals from a manual adjusting circuit 24.

Normally, the switch 19 is thrown to the DDC side and the switch 20 to the AUTO side. When sampling a control system associated with the input terminal 16 switches 18a and 18b will be thrown to the S side as above described to apply the output of the computer 15 calculated in accordance with the input deviation to the amplifier 21 through switches 18a, 19 and 20 so that the output of the amplifier is sent to the corresponding actuator via the output terminal 22. At this time the switch 18b is thrown to the S side to ground one terminal of a condenser 23. As a result, the condenser 23 will be charged by the output from the amplifier 21 to store the final output during sampling. Upon completing the sampling operation, switches 18a and 18b will be switched to the H side. Then the computer 15 will perform a similar operation on another control system. The final output stored in the condenser during sampling is applied to the amplifier 21 through transfer switches 18a, 18b, 19 and 20 until the input terminal 16 is again sampled. Thus, the amplifier 21 maintains the final output produced during sampling. During the next sampling time, the condenser 23 will be charged by the output from the amplifier 21 in accordance with the new output of the computer. Similar cycles of operations are repeated.

Upon occurrence of a fault, causing the computer 15 to malfunction, the transfer switch 19 is transferred to the PID side. Then the analog computing circuit 25 comprises an analog control system in co-operation with said operation amplifier 21. Thus, the measured signal applied to the input terminal 16 and the reference value from the reference source are applied to a comparator 26 and the deviation therebetween is supplied to the input side of the operational amplifier 21 through a parallel circuit comprised by an integrating condenser 27 and an integrating resistor 28 and transfer switches 19 and 20. The output from the operational amplifier 21 is fed back to the input side thereof through a feedback resistor 29, a parallel circuit comprised by a differentiating condenser 30 and a differentiating resistor 31, a feedback condenser 32 and said transfer switches 19 and 20. Proportional integral and derivative actions are made on the deviation such that the deviation of the analog quantity becomes zero thus providing an actuating signal to the output terminal 22 to drive the actuator.

As can be noted from the foregoing description, according to this invention the holding circuit for the computer output is comprised by the operational amplifier 21 and the condenser 23 so that no mechanical element such as a pulse motor, potentiometer and the like is needed. Where switches 18a and 18b are comprised by electronic switches such as transistors or the like it is possible to improve their life and reliability. When compared with the pulse motor or other mechanical element the response speed is higher so that it is possible to vary by 100% the output during one sampling time of approximately 10 microseconds. Further addition of a simple computing circuit 25 to the operational amplifier 21 assures similar operation as the conventional analog PID controller. Consequently, back-up operation could be provided when the computer becomes out of order. Since this back-up device also functions as the operational amplifier 21 for holding the output from the computer the cost and floor space of installation can be greatly reduced when compared with an arrangement comprising two juxtaposed computers or analog controller. Further by constructing the transfer switch 20 to be responsive to fault detection and by presetting the manual adjustable circuit 24 to provide fail-safe outputs, it is possible to positively protect the plant when the transfer switch 20 is accidentally thrown to the MAN side.

Thus this invention provides a highly reliable and economical back-up device for a computer control system.

What is claimed is:

1. A control device for use in conjunction with a digital computer for controlling at least one control system, said computer having sampling means to sample control signals from said control system and producing first signals in response to deviations of control signals received from said at least one control system from a predetermined reference value, comprising:
   a holding circuit coupled to said computer for holding said first signals from said computer during a holding time which is subsequent to the sampling time of said sampling means and for applying an analog actuating signal to said at least one control system, said holding circuit including:
      an operational amplifier coupled to the output of said computer and for producing said actuating signal; and
      a memory device coupled to said operational amplifier for memorizing the output thereof; and
   an analog computing device coupled to said operational amplifier and operable when said digital computer is in an out-of-order condition for causing said operational amplifier to produce analog actuating signals for said at least one control system which correspond substantially to the analog actuating signals generated by said holding circuit in response to the first signals from said computer for controlling said at least one control system when said digital computer is in an out-of-order condition.

2. A control device for use with a digital computer which receives a control signal from at least one of a plurality of control systems, said computer sampling said control signals and performing a predetermined computation thereon to produce respective first signals corresponding to each control system, said control device generating respective actuating signals responsive to said first signals which are applied to respective control systems to cause the control signals generated thereby to be a predetermined value, comprising:
   at least one amplifier associated with said at least one control system,
   at least one switching device associated with said at least one control system for coupling said amplifier to the output of said computer such that when said computer is in a normal operating condition the signal output from said computer is coupled to said amplifier during the sampling period corresponding to its associated control system;
   at least one memory device associated with said at least one control system coupled to said amplifier and to said switching device to receive, when said computer is in a normal operating condition, the output of said amplifier each time said amplifier receives an input signal from said computer and to store the output of said amplifier and couple the stored output back to the input of said amplifier until the next input signal from said computer is applied to said amplifier;
   at least one comparator associated with said at least one control system coupled to receive said control signals and coupled to a source of reference values for comparing the control signals from said associated control system with a reference value; and
   at least one analog computing device associated with said at least one control system coupled to said switching device and to said comparator for receiving the output signal from said comparator;
   said switching device being responsive to said computer being in an out-of-order condition to couple said analog computing device to said amplifier for providing an actuating signal substantially corresponding to the actuating signal which would have been generated in response to signals generated by said computer.

3. A control device according to claim 2, further comprising manual adjusting circuit for providing fail-safe outputs.

4. A control device according to claim 2, wherein said switching device comprises:
- a first switch for coupling, during the sampling time, the final output of a respective first signal provided by the computer to said memory device, and for coupling, during times other than the sampling time, said memory device to the input of said amplifier such that said final output of said first signal is held in said amplifier; and
- a second switch for coupling the output of said computer to said amplifier when said computer is in a normal operating condition and for coupling said analog computing device to said amplifier when said computer is in an out-of-order condition.

5. A control device according to claim 2, wherein said memory device comprises a condenser which is charged by the output voltage from said amplifier each time said amplifier receives an input signal from said computer and supplies its terminal voltage to the input of said amplifier during periods of time other than when said amplifier is receiving an input from said computer.

6. A control device according to claim 2, wherein said analog computing device comprises:
- a parallel circuit including a reset condenser and a reset resistor selectively coupled between the output of said comparator and the input of said amplifier;
- a feedback resistor coupled to the output of said amplifier;
- a feedback condenser; and
- a second parallel circuit comprising a resistor and a condenser, said feedback resistor, said feedback condenser and said second parallel circuit being connected in series between the input and output terminals of said amplifier.

7. A control device according to claim 2, wherein said amplifier is an operational amplifier.

References Cited

UNITED STATES PATENTS

| | | | |
|---|---|---|---|
| 3,050,673 | 8/1962 | Widmer | 340—173 |
| 3,161,858 | 12/1964 | Sanders | 320—1 |
| 3,247,497 | 4/1966 | Lee | 320—1 |
| 3,249,925 | 5/1966 | Single | 320—1 |
| 3,273,013 | 9/1966 | Shepard | 320—1 |

TERRELL W. FEARS, Primary Examiner